United States Patent [19]

Gerard

[11] Patent Number: 4,744,286
[45] Date of Patent: May 17, 1988

[54] BRAKE MOTOR SUBASSEMBLY

[75] Inventor: Jean-Louis Gerard, Paris, France

[73] Assignee: Bendix France, Drancy, France

[21] Appl. No.: 24,276

[22] Filed: Mar. 10, 1987

[30] Foreign Application Priority Data

Mar. 19, 1986 [FR] France ................................. 86 03937

[51] Int. Cl.[4] ........................ F01B 31/14; F15B 15/17;
F16D 55/02
[52] U.S. Cl. ...................................... 92/13.1; 92/13.7;
92/51; 92/53; 91/415; 188/71.9; 188/196 F
[58] Field of Search ................... 92/13.1, 13.7, 51, 53;
91/415; 192/111 A; 188/71.9, 196 F

[56] References Cited

FOREIGN PATENT DOCUMENTS 0047028 4/1980 Japan .................................. 188/71.9

Primary Examiner—Robert E. Garrett
Assistant Examiner—Thomas E. Denion
Attorney, Agent, or Firm—Larry J. Palguta; Ken C. Decker

[57] ABSTRACT

The brake motor subassembly with automatic play compensation limitation by way of a stepped pilot piston (20), comprising a first cylindrical peripheral surface of larger diameter (21) sliding in an inner bore (7) of the control piston (1) and a second cylindrical peripheral surface of reduced diameter (24) interacting sealingly slideably with an annular gasket (17) in the piston (1), has an intermediate radial shoulder (26) which, during the movement of the pilot piston (20) because of the opposing effective cross-sections ($s_1$, $s_2$), interacts with the annular gasket (17) so as thereby to present a new effective surface ($s_3$) preventing the continuation of the movement of the pilot piston (20) and thus avoiding the compression of the elastic member (11) which normally stresses the automatic compensation nut (14).

3 Claims, 1 Drawing Sheet

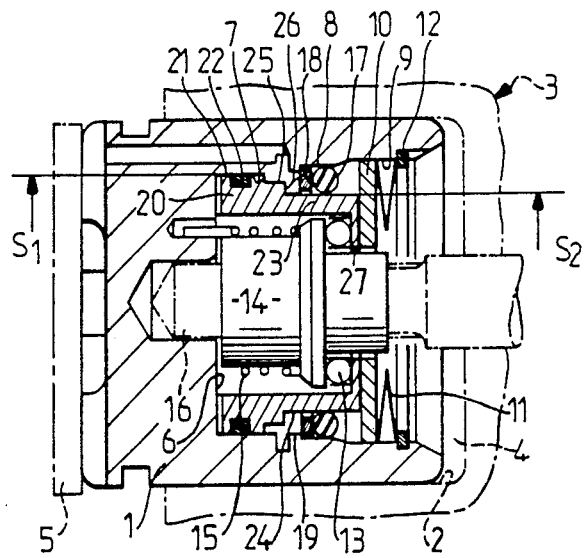
FIG_1
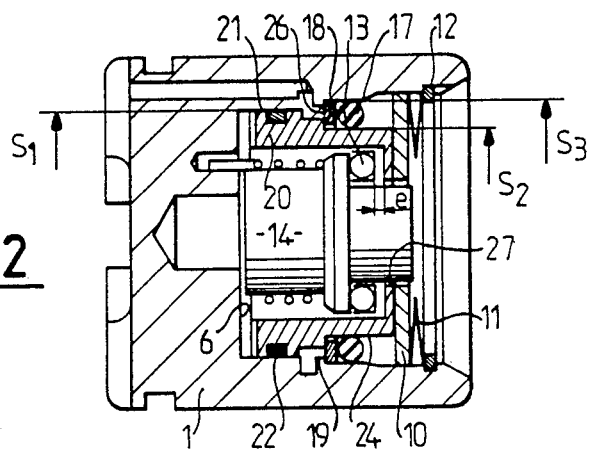
FIG_2
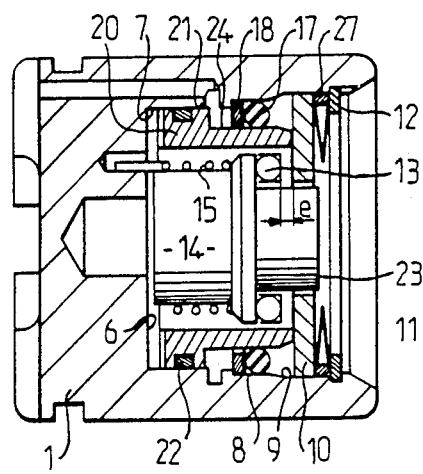
FIG_3

BRAKE MOTOR SUBASSEMBLY

The present invention concerns a brake motor subassembly, and more particularly a disc brake, of the type comprising a control piston typically intended to be sealingly slideably mounted in a bore in a brake body, having an inner cavity which is delimited by a bottom wall and peripherally by a stepped bore and in which is arranged an automatic compensation nut typically intended to be engaged by meshing on a threaded spindle mounted in the brake body and stressed towards the bottom wall, via a washer, by an elastic member bearing on the control piston axially opposite the bottom wall, and a stepped pilot piston intended to make it possible to prevent automatic compensation in the event of an excessive actuation pressure exerted on the control piston, to avoid overadjustment of the brake motor, the stepped pilot piston having a first outer cylindrical peripheral surface of larger diameter interacting sealingly slideably with one end of reduced diameter of the stepped bore and, in the vicinity of its end axially opposite the first peripheral surface and interacting with the washer by bearing on it, a second cylindrical peripheral surface of reduced diameter interacting sealingly slideably with an annular gasket mounted in an intermediate portion of the stepped bore.

A brake motor having such a subassembly is described in U.S. Pat. No. 4,691,809 issued on Sept. 8, 1987, the content of which is assumed to be incorporated herein for reference. In the subassembly described in this document, when the stepped pilot piston is operated to push back the washer against the elastic member and thus break the drive connection between the control piston and the automatic compensation nut in the event of excessive brake pressure, under the effect of this brake pressure the pilot piston is moved, in the opposite direction to the bottom wall of the inner cavity of the control piston, into a position which can correspond to a complete compression of the elastic member, and this can result in a change in the characteristics of the elastic member and even in damage to it.

It is therefore an object of the invention to prevent these disadvantages by providing an arrangement of simple, robust and effective structure which is completely integrated and can easily by adapted and does not entail increased production costs and which makes it possible to avoid compressing the elastic member without influencing the operating characteristics of the pilot piston and, on the other hand, makes it possible to maintain a capacity for automatic play compensation even in the event of accidental damage to the elastic member.

To achieve this, according to one feature of the invention, the brake motor subassembly has integrated means of limiting the stroke of the pilot piston in the opposite direction to the bottom wall, thus limiting the compression of the elastic member to a sufficient value to allow the release of the washer of the automatic compensation nut.

According to a more particular aspect of the invention, the limiting means comprise a hydraulically acting stop which limits the movement of the pilot piston by a differential pressure effect or, alternatively, a mechanically acting stop.

The invention will now be described by way of example with reference to the accompanying drawings in which:

FIG. 1 is a diagrammatic sectional view of a first embodiment of a brake motor subassembly according to the invention, shown in the position of rest;

FIG. 2 is a view similar to that of FIG. 1, showing the pilot piston in the extreme position of disengagement of the automatic compensation device;

FIG. 3 is a view similar to that of FIG. 2, showing a second embodiment of the invention.

In the following description and in the drawings, identical or similar elements bear the same reference numerals.

FIG. 1 shows a brake motor subassembly of the type such as described in U.S. Pat. No. 4,691,809 mentioned above and comprising a control piston 1 intended to be sealingly slideably mounted in a bore 2 of a brake body 3 defining a pressure chamber 4 receiving a hydraulic pressure-fluid making it possible to move the control piston 1 in the bore 2 to actuate at least one friction element 5, in order to bring the latter into frictional contact with a rotary member to be braked (not shown). The control piston 1 has on the inside an inner cavity delimited by a bottom wall 6 and peripherally by a stepped bore which comprises, in the vicinity of the bottom wall 6, an inner end portion of reduced diameter 7 connected to an intermediate portion of larger diameter 8 which itself is connected to another end portion of larger diameter 9. Sealingly and slideably mounted in this end portion of larger diameter 9 is a washer 10 stressed in the direction of the bottom wall 6 by an elastic member 11 which typically consists of Belleville washers bearing at the rear on a retaining ring 12 mounted in the opening-out end of the bore portion of larger diameter 9. The washer 10 interacts, via an axial ball-bearing 13, with a rear shoulder of an automatic compensation nut 14 associated with a one-way engaging spring 15 according to a conventional arrangement, the nut 14 being intended, when the equipped control piston 1 is installed in the bore 2 of the brake body, to interact by meshing with a threaded spindle 16 mounted in the brake body 3 and typically coupled to a mechanical actuation device of the control piston 1. Arranged in the intermediate bore portion 8 is an annular gasket 17 associated with a retaining washer 18 placed axially up against a shoulder 19 which extends radially inwards and which forms the connection between the end portion of smaller diameter 7 and the intermediate portion 8 of the stepped bore.

Arranged co-axially round the nut 14 in the cavity of the control piston 1 is a stepped pilot piston 20 which has, on the same side as the bottom wall 6, a thick end part having a first outer cylindrical peripheral surface of larger diameter 21 inteacting sealingly and slideably via an annular gasket 22 with the end portion of smaller diameter 7 of the stepped bore, and an opposite end part of reduced thickness 23 which interacts in engaging contact with the washer 10 and which has a cylindrical peripheral surface of reduced diameter 24 interacting sealingly and slideably with the annular gasket 17. In the rest position illustrated in FIG. 1, the pilot piston 20 is laid up against the bottom wall 6 by means of the washer 10 under the effect of the elastic member 11. Since the pilot piston 20 has, axially, on either side, differential annular surfaces $S_1$ and $S_2$ exposed to the fluid pressure in the pressure chamber 4, with $S_1$ greater than $S_2$, when this fluid pressure exceeds a value determined by the ratio of these surfaces and the force of the elastic member 11, the pilot piston 20 moves (to the right in the drawings) counter to the force of the elastic member 11, in order to shift the washer 10 away from the rear shoulder of the nut 14 and thus prevent the latter from undergoing by means of the washer 10, which via the elastic member 11 accompanies the movement of the control piston 1, an axial thrust which results in a play-compensating rotation of the nut 14 on the threaded spindle 16.

According to the invention, in the embodiment illustrated in FIGS. 1 and 2, the stepped piston 20 has an intermediate portion having a cylindrical peripheral surface 25 of an intermediate diameter between those of the peripheral surfaces 21 and 24 and connected to the latter by means of a radial shoulder 26 which, as shown in FIG. 2, is capable of coming up against the ring 18 when the pilot piston 20 moves to the rear. Under these conditions corresponding to a limited compression of the elastic member 11, although the effective surface on the left of the pilot piston 20 remains the surface $S_1$, the effective surface exposed to the fluid pressure on the right of the pilot piston 20 is no longer the surface $S_2$, but, because of the annular gasket 17, the surface $S_3$ greater than $S_1$, as defined by the diameter of the intermediate part 8 of the stepped bore. As a result of this reversal of the ratio of the effective surfaces subjected to the fluid pressure of the pilot piston 20, the movement of the latter to the right is interrupted, the pilot piston 20 maintaining the position shown in FIG. 2 because the assembly consisting of the annular gasket 17 and of the retaining ring 18 cannot move to the left owing to the shoulder 19. As soon as the actuating pressure in the chamber 4 decreases, the differential pressure effect on the pilot piston 20 diminishes and the elastic member 11 returns the washer 10 and the pilot piston 20 towards the position of rest shown in FIG. 1.

FIG. 3 illustrates a second embodiment of the invention, in which the pilot piston 20 retains the configuration of U.S. Pat. No. 4,691,809 here an annular spacer ring 27 being arranged in the end portion of larger diameter 9 of the stepped bore, between the washer 10 and the retaining ring 12, round the elastic member 11. It will be appreciated that, as shown in FIG. 3, here the rearward movement of the pilot piston 20 (and therefore of the washer 10) is limited because the washer 10 comes up against the spacer ring 27 which is itself then laid against the retaining ring 12, the axial thickness of the spacer ring 27 determining the degree of compression allowed for the elastic member 11.

It may happen, especially according to production batches and qualities, that the elastic member 11 fractures or is damaged in the course of time, irrespective of the measures taken according to the invention to prevent it from being subjected to excessive compression. In the known automatic compensation systems of the type in question, in practice such irreversible damage to the elastic member makes it impossible, from then on, to obtain automatic compensation for the wear of the friction linings. However, the arrangement according to the invention makes its possible, in this case, to maintain an automatic compensation capacity which, albeit less efficient than an arrangement in perfect running order, is nevertheless effective over the entire operating range of the brake motor. In fact, in the embodiment with a mechanical stop shown in FIG. 3, the retreat of the washer 10 is limited by the axial thickness of the spacer ring 27 which thus determines the clearance e of the washer 10 relative to the bearing 13. It will be appreciated that, should the elastic member 11 have become ineffective, during operation, the washer will maintain the relative position shown in FIG. 3, up against the ring 27 which is itself up against the ring 12. Consequently, when the wear of the linings has become equal to e and the piston 1 has advanced proportionately in relation to the nut 14 immobolized on its screw 16, the compensation nut 14 will be actuated once again by the washer 10, the stepped piston 20 then becoming inoperative. In the embodiment with a hydraulic stop shown in FIGS. 1 and 2, the same effect is obtained by making the end part 23 with a collar 27 which extends radially inwards between the washer 10 and the bearing 13. As long as the elastic member 11 is intact, the mode of operation is similar in all respects to that described above (the collar 27 in no way changing the active surfaces of the stepped piston 20). However, here the clearance e (FIG. 2) is formed between the bearing 13 and the front annular face of the collar 27 and is determined by the axial dimensions of the stepped piston 20 between its shoulder 26 and its front end, on the one hand, and the collar 27, on the other hand. As with the embodiment of FIG. 3, when, the elastic member 11 being inoperative, the piston 1 has advanced a distance e in relation to the nut 14, the nut is then actuated by the collar 27, and under the effect of the brake pressure the stepped piston 20 is laid by means of its shoulder 26 against the ring 18 and the latter accompanies the movement of the piston 1 and itself remains laid against the shoulder 19 of the stepped bore under the effect of the pressure exerted on the gasket 17, so that the stepped piston 20 in turn accompanies the movement of the piston 1 in order to actuate the compensation nut 14 from then on, the washer 10 then no longer performing any function.

I claim:

1. A brake motor subassembly comprising a control piston having an inner cavity delimited by a bottom wall and peripherally by a stepped bore and in which is arranged an automatic compensation nut biased toward the bottom wall via a washer by an elastic member bearing on the control piston axially opposite the bottom wall, and a stepped pilot piston having a first cylindrical peripheral surface of larger diameter interacting sealingly and slideably with one end of reduced diameter of the stepped bore and, in the vicinity of an opposite end axially opposite the first cylindrical peripheral surface, interacting with the washer, a second cylindrical peripheral surface of reduced diameter interacting sealingly and slideably with an annular gasket mounted in an intermediate portion of the stepped bore, characterized in that the subassembly has integrated means for limiting the stroke of the pilot piston in a direction opposite the bottom wall, the integrated limiting means comprising a mechanically acting stop which includes a stop member for engaging the washer to limit displacement of the washer by means of movement of the pilot piston, the elastic member bearing on a retaining ring mounted in an end of larger diameter of the stepped bore, the stop member comprising an intermediate ring disposed about the elastic member and arranged between the washer and retaining ring so that the stop member engages the retaining ring and displaced washer to provide said mechanically acting stop which protects said elastic member from excessive compression.

2. The subassembly according to claim 1, characterized in that the elastic member consists of Belleville washers.

3. The brake motor subassembly comprising a control piston having an inner cavity delimited by a bottom wall and peripherally by a stepped bore and in which is arranged an automatic compensation nut biased toward the bottom wall via a washer by an elastic member bearing in the control piston axially opposite the bottom wall, and a stepped pilot piston having a first cylindrical peripheral surface of larger diameter interacting sealingly and slideably with one end of reduced diameter of the stepped bore and, in the vicinity of an opposite end axially opposite the first cylindrical peripheral surface, interacting with the washer, a second cylindrical peripheral surface of reduced diameter interacting sealingly and slideably with an annular gasket mounted in an intermediate portion of the stepped bore, characterized in that the subassembly has integrated means for limiting the stroke of the pilot piston in a direction opposite the bottom wall, the integrated limiting means comprising a hydraulically acting stop which includes the pilot piston having a third cylindrical peripheral surface of intermediate diameter connected to the second cylindrical peripheral surface of reduced diameter by means of a radial shoulder, and the radial shoulder interacting with the annular gasket by bearing operatively against the gasket, and the opposite end of the pilot piston engaging the washer and having a radial collar extending radially inwardly and disposed axially between the washer and nut, the radial collar engaging bearing means and the washer, the bearing means located between the nut and collar, the axial width of the radial collar contributing to the determination of a clearance that may be effected between the collar and bearing means as a result of movement of the pilot piston against the washer and elastic member.

* * * * *